United States Patent
Kaminski et al.

(10) Patent No.: US 7,579,724 B2
(45) Date of Patent: Aug. 25, 2009

(54) METHODS AND APPARATUS FOR USING AN ELECTRICAL MACHINE TO TRANSPORT FLUIDS THROUGH A PIPELINE

(75) Inventors: Christopher Anthony Kaminski, Niskayuna, NY (US); Blake Weldon Wilson, Glenville, NY (US); James Michael Fogarty, Schenectady, NY (US); Emil Donald Jarczynski, Scotia, NY (US); John Russell Yagielski, Scotia, NY (US); Konrad Roman Weeber, Rexford, NY (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 11/446,029

(22) Filed: Jun. 2, 2006

(65) Prior Publication Data

US 2007/0278879 A1 Dec. 6, 2007

(51) Int. Cl.
*H02K 9/00* (2006.01)
(52) U.S. Cl. .............................. 310/58; 310/88; 310/54
(58) Field of Classification Search ............. 310/86–89, 310/58, 62–63, 64, 216–218, 52–54
See application file for complete search history.

(56) References Cited

U.S. PATENT DOCUMENTS

| | | | | |
|---|---|---|---|---|
| 4,901,520 A | * | 2/1990 | Kozak et al. ................... | 60/782 |
| 4,968,911 A | * | 11/1990 | Denk ........................... | 310/42 |
| 5,091,666 A | | 2/1992 | Jarczynski | |
| 5,205,721 A | * | 4/1993 | Isaacson ...................... | 417/356 |
| 5,886,436 A | * | 3/1999 | Schneider et al. ............. | 310/89 |
| 6,448,685 B1 | | 9/2002 | Mayer et al. | |
| 6,652,249 B2 | * | 11/2003 | Kenney et al. ........... | 417/410.3 |
| 6,681,476 B2 | | 1/2004 | Mayer et al. | |
| 6,896,494 B2 | * | 5/2005 | Sunaga et al. ............. | 417/423.1 |
| 7,129,608 B2 | * | 10/2006 | Eppler et al. ................... | 310/89 |
| 2006/0261686 A1 | * | 11/2006 | Rutsyamuka ................. | 310/53 |

* cited by examiner

*Primary Examiner*—Thanh Lam
(74) *Attorney, Agent, or Firm*—Armstrong Teasdale LLP

(57) ABSTRACT

A stator for an electrical machine includes teeth assembled from a plurality of stacked laminations mounted on a cylindrical protective surface thereby forming a plurality of slots. The stator also includes an armature winding assembled within the teeth by inserting components of the armature winding into the plurality of stator slots from positions external to the teeth in a manner that facilitates mitigating potential for coil distortion. The armature winding includes a plurality of coils that each include an end winding. The stator further includes a segmented yoke inserted around the armature winding in a manner that facilitates mitigating a potential for disturbing the end winding of the coils. Independently assembling the stator components in this manner facilitates varying a thickness and/or the number of heat conducting laminations between the yoke and teeth that subsequently facilitates heat transfer from the armature winding to an outer pressure casing of the machine.

13 Claims, 10 Drawing Sheets

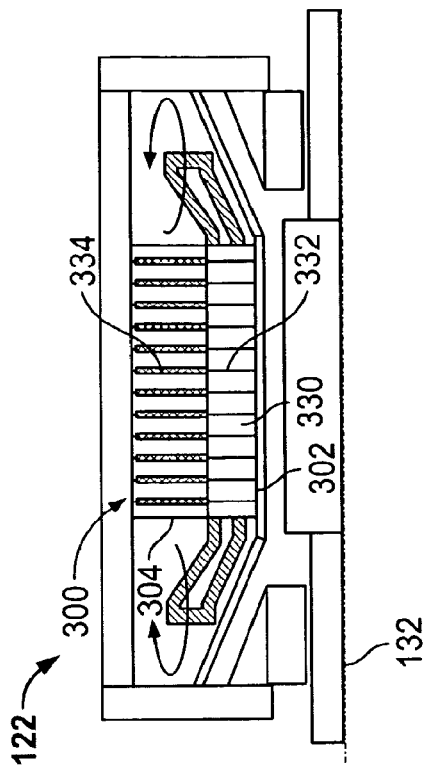
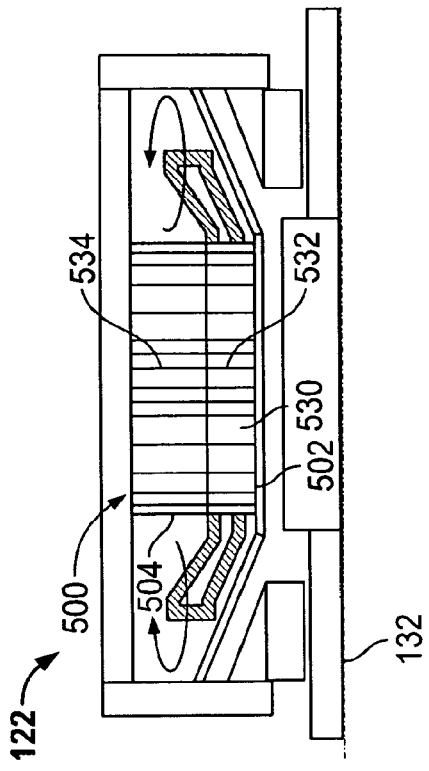
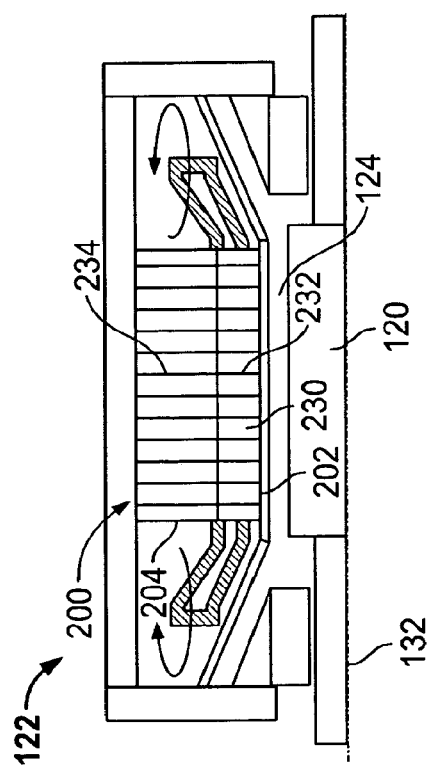
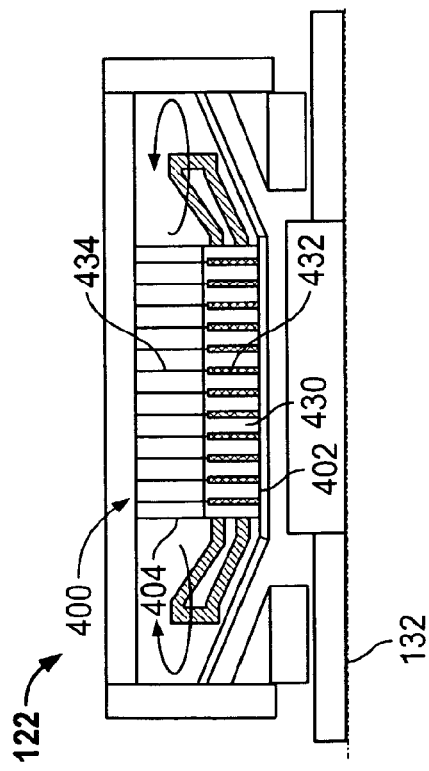
FIG. 10
FIG. 12
FIG. 11
FIG. 13

METHODS AND APPARATUS FOR USING AN ELECTRICAL MACHINE TO TRANSPORT FLUIDS THROUGH A PIPELINE

BACKGROUND OF THE INVENTION

This invention relates generally to fluid transport systems and, more particularly, to methods and apparatus for using an electrical machine to transport fluids through a pipeline.

Fluid transport is used in a variety of different industries including, but not limited to, the chemical, oil and gas industries. In one known fluid transport application fluids are transported from on-shore or off-shore locations to processing plants for subsequent use. In other known applications, fluid transport is used in hydrocarbon processing industries and chemical industries, and to facilitate distribution to end-users.

At least some known fluid transport stations use fluid transport apparatus such as compressors, fans and/or pumps that are driven by gas turbines. Some of these turbines drive the associated fluid transport apparatus via a gearbox that either increases or decreases a gas turbine output drive shaft speed to a predetermined apparatus drive shaft speed. Electrical machines (i.e., electrically-powered drive motors, or electric drives) may be advantageous over mechanical drives (i.e., gas turbines) in operational flexibility (variable speed for example), maintainability, lower capital cost and lower operational cost, better efficiency and environmental compatibility. Additionally, electric drives are generally simpler in construction than mechanical drives, generally require a smaller foot print, may be easier to integrate with the fluid transport apparatus, may eliminate the need for a gearbox, and/or may be more reliable than mechanical drives.

However, systems using electric drives may be less efficient than those systems using mechanical drives. At least some factors affecting electric drive efficiency include electrical and electronic topologies of motor drive and drive controls, electrical power source quality and efficiency, size and weight of electric drive components (stators for example) and magnetic coupling strength. Moreover, fluid transport apparatus electric drives generate heat via the drive components, within the stators for example, and may require supplemental systems to facilitate heat removal. For example, some known electric drives use the fluid being transported as the primary heat transfer medium and channel the fluid through and around the stator. However, in some cases, the fluid being transported may have aggressive constituents or impurities which may adversely affect the efficiency of the components being used.

BRIEF DESCRIPTION OF THE INVENTION

In one aspect, a stator assembly for an electrical machine is provided. The stator assembly includes a pressure vessel including at least one enclosure defined therein. The stator assembly also includes a yoke within the pressure vessel that includes a plurality of members. Each of the members includes at least one mating surface and the members are removably coupled together along the mating surfaces. The stator assembly further includes a plurality of teeth within the yoke defining a plurality of slots such that adjacent teeth define a slot therebetween.

In another aspect, a stator assembly for an electrical machine is provided. The stator assembly includes a pressure vessel and a yoke in thermal communication with the pressure vessel to facilitate heat removal from the stator assembly. The stator assembly also includes a plurality of teeth including a plurality of laminations. The plurality of laminations includes at least one of a first lamination having a first thermal conductivity and a fist magnetic permeability and at least one of a second lamination having a second thermal conductivity and a second magnetic permeability. The first thermal conductivity is different than the second thermal conductivity and the first magnetic permeability is different than the second magnetic permeability. The second lamination includes a first portion that extends radially within the plurality of teeth with a first predetermined axial thickness and a second portion that extends radially within the yoke with a second predetermined axial thickness. The second portion is in thermal communication with the pressure vessel to facilitate heat removal from the stator assembly.

In a further aspect, a fluid transport station is provided. The fluid transport station includes a fluid transport assembly. The fluid transport assembly includes at least one rotatable shaft. The station also includes a drive motor including a rotor assembly and a stator assembly that further includes a pressure vessel, a yoke, and a plurality of teeth. The pressure vessel includes at least one enclosure defined therein and the yoke includes a plurality of members. Each of the members includes at least one mating surface and the members are removably coupled together along the mating surfaces. The yoke is positioned within the pressure vessel. The plurality of teeth define a plurality of slots such that adjacent teeth define a slot therebetween. The plurality of teeth are positioned within the yoke. The rotor is magnetically coupled to the stator assembly. The drive motor rotor assembly is rotatably coupled to the fluid transport assembly at least one rotatable shaft.

BRIEF DESCRIPTION OF THE DRAWINGS

FIG. 10 is a cross-sectional schematic view of a plurality of thermally conductive laminations of the exemplary stator assembly that may be used with the electric motor shown in FIG. 2;

FIG. 11 is a cross-sectional schematic view of an alternative stator with a plurality of thermally conductive laminations in the yoke portion that are thicker than those in the teeth portion that may be used with the electric motor shown in FIG. 2;

FIG. 12 is a cross-sectional schematic view of an alternative stator with a plurality of thermally conductive laminations in the teeth portion that are thicker than those in the yoke portion that may be used with the electric motor shown in FIG. 2;

FIG. 13 is a cross-sectional schematic view of a plurality of alternative thermally conductive stator laminations with a varying axial pitch that may be used with the electric motor shown in FIG. 2;

DETAILED DESCRIPTION OF THE INVENTION

Figure 1:
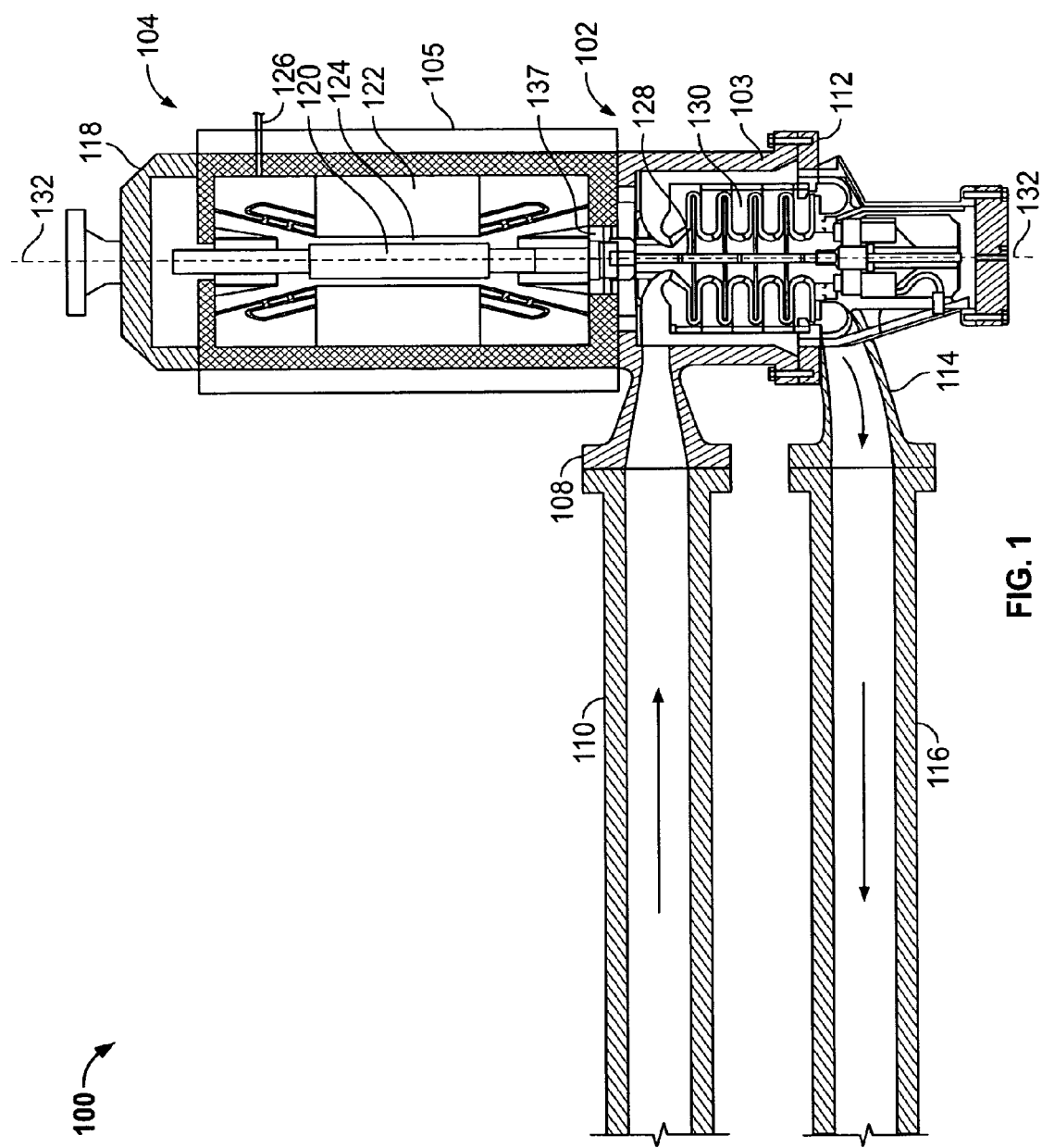
FIG. 1 is a cross-sectional schematic view of an exemplary fluid transport station.

FIG. 1 is a cross-sectional schematic view of an exemplary fluid transport station 100. In the exemplary embodiment, station 100 is a submerged natural gas compressing station 100 that includes a fluid transport assembly 102. In the exemplary embodiment, assembly 102 is a multi-stage compressor 102 that is rotatingly coupled to an electric drive motor 104. Alternatively, assembly 102 may be, but is not limited to being a pump or a fan. Station 100 may be positioned in any geographical location and may facilitate transport of any fluid wherein predetermined operational parameters are attained. Examples of fluids that may be transported by station 100 include, but are not limited to untreated methane channeled to station 100 from a natural source (not shown in FIG. 1).

In the exemplary embodiment, motor 104 is a permanent magnet-type electric motor 104 designed for operating speeds above the maximum speed of 3600 revolutions per minute typically associated with synchronous motors powered by a 60 Hz electrical power source. Therefore, motor 104 is generally referred to as a "super-synchronous" motor. More specifically, in the exemplary embodiment, motor 104 includes a variety of features that may be advantageous over alternative drive mechanisms. For example, in the exemplary embodiment, motor 104 may attain speeds in a range of approximately 8,000 to 20,000 revolutions per minute (rpm) without using additional components, for example, gearboxes to facilitate increasing output speed. Alternately, motor 104 speeds in excess of 20,000 rpm may be used. The increased speeds facilitate a rapid pressurization of the gas, thus increasing the efficiency and effectiveness of compressing station 100. Additionally, in this embodiment, the elimination of additional components, for example, gearboxes, results in station 100 requiring a smaller foot print and the elimination of the associated maintenance. Another feature of this embodiment is the elimination of wearable components, such as carbon-based slip rings. As a result, in the exemplary embodiment, the reliability of the compressing station 100 is facilitated to be increased with motor 104. Alternatively, motor 104 may be a permanent magnet-type synchronous motor, a separately excited motor, an induction motor, or any other drive device that attains predetermined operational parameters and that enables station 100 to function as described herein.

Compressor 102 is positioned and fixedly secured within a compressor housing 103. Motor 104 is positioned and fixedly secured within a pressure vessel 105. In the exemplary embodiment, housing 103 and pressure vessel 105 are fabricated as individual components and coupled together by methods known in the art. Alternatively, housing 103 and pressure vessel 105 may be fabricated as an integrated (unitary) member. Also, in the exemplary embodiment, housing 103 and pressure vessel 105 are fabricated via a casting or a forging process. Alternatively, housing 103 and pressure vessel 105 may be fabricated using any method known in the art, for example, a welding process that enables housing 103 and pressure vessel 105 to be fabricated and assembled as described herein. Housing 103 includes a compressor suction fixture 108 that is coupled in flow communication to an inlet pipeline 110. Pipeline 110 may be fabricated of metal, rubber, polyvinylchloride (PVC), or any material that attains predetermined operational parameters associated with the fluid being transported and the location of station 100.

In the exemplary embodiment, station 100 also includes a compressor end piece 112 that is coupled to and extends outward from housing 103. End piece 112 facilitates enclosing compressor 102 within station 100 subsequent to insertion of compressor 102 into housing 103 and includes a compressor discharge fixture 114 that is coupled in flow communication to a compressor outlet pipeline 116 that is substantially similar to inlet pipeline 110. In addition, a motor end cover assembly 118 is fixedly coupled to pressure vessel 105. End cover 118 facilitates enclosing motor 104 within station 100 subsequent to insertion of motor 104 into pressure vessel 105.

Motor 104 includes a rotor assembly 120 and a stator assembly 122 that are positioned such that a gap 124 is defined between stator assembly 122 and rotor assembly 120. A plurality of power supply cables positioned within electric cable conduit 126 facilitate coupling station 100 to a power source, for example, a variable frequency drive (VFD) (not shown in FIG. 1). When stator assembly 122 is powered, an electromagnetic field is induced within motor 104. Gap 124 facilitates magnetic coupling of rotor assembly 120 and stator assembly 122 to generate a torque that induces rotation in rotor assembly 120.

Compressor 102 includes a rotatable drive shaft 128 that is rotatably coupled to rotor assembly 120. In the exemplary embodiment, compressor 102 includes a plurality of compressor stages 130. Alternatively, compressor 102 may include only one stage. Rotor assembly 120 and shaft 128 are rotatable about an axis of rotation 132. System 100 further includes a motor-compressor housing seal 137 that facilitates mitigating flow communication between motor pressure vessel 105 of compressor housing 103. Axis of rotation 132 may be in any orientation that facilitates attaining predetermined operational parameters of station 100 that includes, but is not limited to, horizontal and vertical orientations.

During operation, the VFD supplies multi-phase alternating current to stator assembly 122 at pre-determined voltages and frequencies. A rotating electromagnetic field (not shown in FIG. 1) is generated in stator assembly 122. A second magnetic field is generated within rotor assembly 120 be methods that include, but are not limited to permanent magnets and external excitation. Interaction of magnetic fields in rotor assembly 120 and stator assembly 122 through gap 124 induces torque, and subsequently, rotation of rotor assembly 120.

Station 100 receives natural gas via inlet pipeline 110 at a first predetermined pressure. The gas is channeled to compressor 102 via suction fixture 108. Gas subsequently flows into compressor 102 and is compressed to a greater density and smaller volume at a second predetermined pressure that is greater than the first predetermined pressure. The compressed gas is discharged to outlet pipeline 116 via discharge fixture 114.

Figure 2:
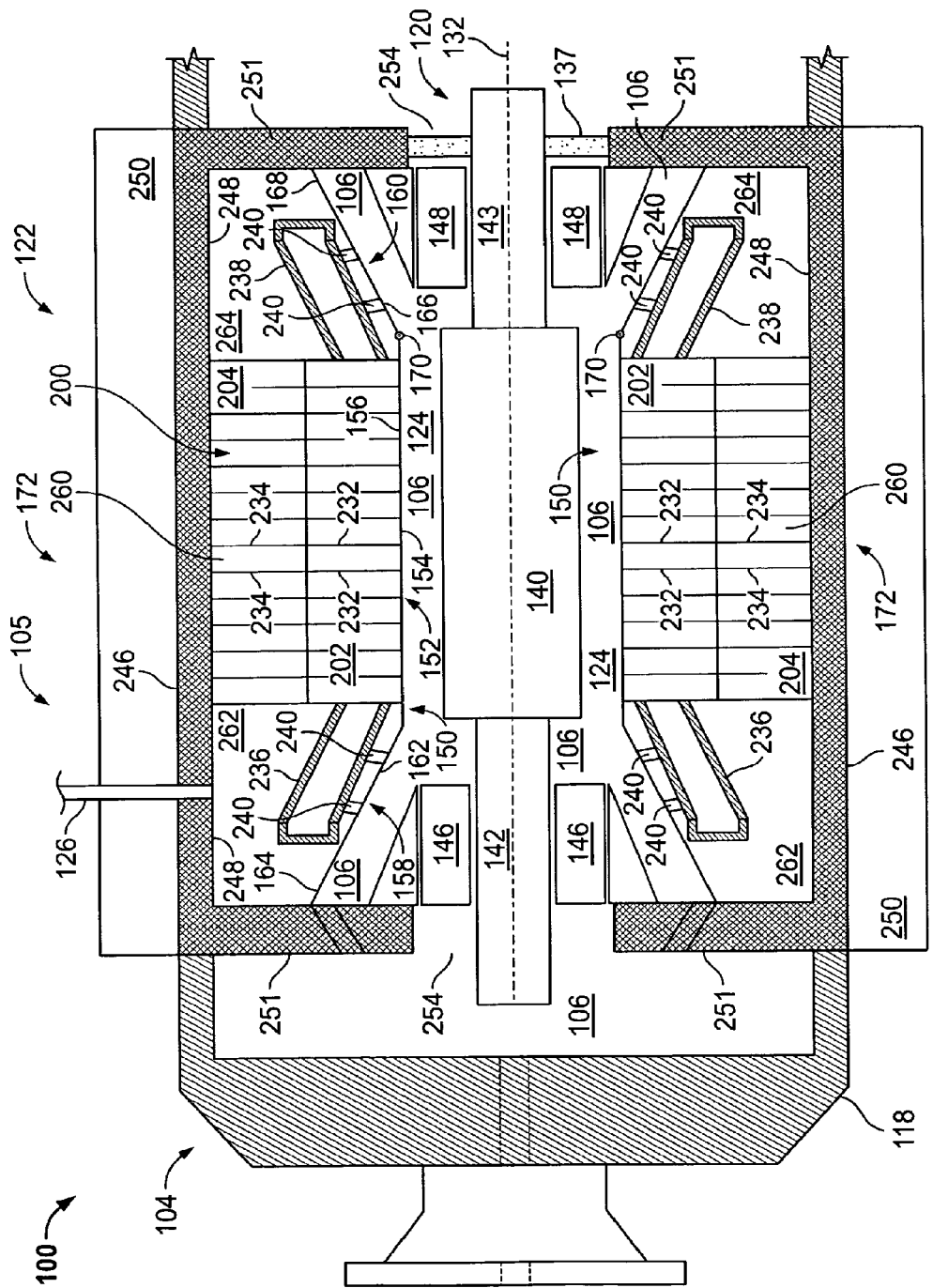
FIG. 2 is a cross-sectional schematic view of an exemplary electric motor that may be used with the fluid transport station shown in FIG. 1.

FIG. 2 is a cross-sectional schematic view of exemplary motor 104 that may be used with fluid transport station 100. As described above, motor 104 includes an end cover assembly 118, rotor assembly 120, stator assembly 122, gap 124, electric cable conduit 126, axis 132 and seal 137. Pressure vessel 105 houses motor 104.

Rotor 120 includes a central portion 140. Central portion may include, but not be limited to a plurality of permanent magnets or a plurality of excitation windings (neither shown in FIG. 2) that is encased within the periphery of portion 140. Rotor 120 also includes outboard spindle portion 142 and an inboard spindle portion 143. Also, portions 142 and 143 are coupled to portion 140 such that rotational forces induced within portion 140 induce rotation in portions 142 and 143 as well as portion 140.

Motor 104 further includes an outboard bearing 146 and an inboard bearing 148 coupled to pressure vessel 105. Bearings 146 and 148 facilitate radial positioning of rotor assembly 120 via rotor portions 142 and 143. In the exemplary embodiment, bearings 146 and 148 are magnetic bearings 146 and 148 that are configured to be an active-type of magnetic bearing. More specifically, a control sub-system (not shown in FIG. 2) is used in conjunction with magnetic bearings 146 and 148 to determine the radial position of the rotational bearing component (not shown in FIG. 2) relative to the fixed component (not shown in FIG. 2) at any given time and facilitate magnetic adjustments to correct any deviations at any given angular position. Magnetic bearings 146 and 148 facilitate operation of rotor assembly 120 at the aforementioned high speeds associated with exemplary motor 104. Alternatively, non-magnetic bearings that may include, but not be limited to journal bearings, for example, that attain predetermined parameters, that include, but are not limited to mitigating vibration and friction losses may be used. At least one rundown bearing (not shown in FIG. 2) may be positioned within motor 104 in a manner similar to bearings 146 and 148 to facilitate radial support to rotor assembly 120 in event of failure of either bearings 146 and/or 148. Furthermore, at least one thrust bearing (not shown in FIG. 2) may be positioned within motor 104 in a manner similar to bearings 146 and 148 to facilitate mitigating the effects of axial thrust of rotor assembly 120 and shaft 128 (shown in FIG. 1).

Figure 3:
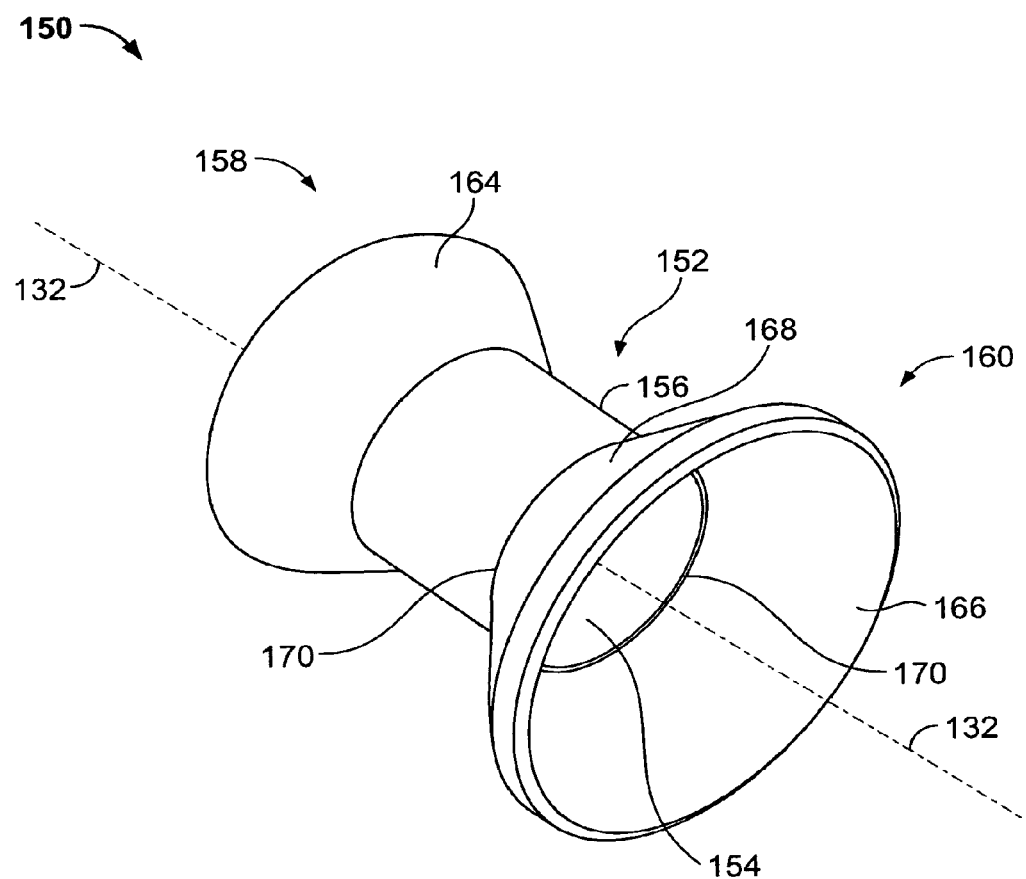
FIG. 3 is a skewed axial schematic view of a portion of an exemplary stator enclosure that may be used with the electric motor shown in FIG. 2.

In the exemplary embodiment, stator assembly 122 is at least partially housed in a stator enclosure 150. FIG. 3 is a skewed axial schematic view of a portion of exemplary stator enclosure 150 that may be used with electric motor 104 (shown in FIG. 2). FIG. 3 is referenced in conjunction with FIG. 2 for a discussion of enclosure 150. Rotor 104 axis of rotation 132 is illustrated in FIG. 3 for perspective.

Station 100 may be employed in transporting fluids with aggressive properties and/or impurities. These fluids may be introduced into pressure vessel 105 for purposes of lubrication and/or cooling of motor 104 components. Enclosure 150 facilitates isolating stator 122 from fluids circulated within pressure vessel 105.

Enclosure 150 includes a center portion 152 that is radially positioned within gap 124. In the exemplary embodiment, center portion 152 is substantially cylindrical. Alternative embodiments are discussed below. Center portion 152 includes a radially inner surface 154 and a radially outer surface 156. At least a portion of stator assembly 122 may contact outer surface 156. Inner surface 154 and an outer periphery of rotor portion 140 define annular gap 124. Parameters associated with the materials used to fabricate portion 152 include, but are not limited to having electrically non-conductive properties, magnetically neutral properties, and having sufficient strength and corrosion resistance to mitigate portion 152 distortion and corrosion during operation and may also include properties that facilitate conductive heat transfer. Portion 152 may be fabricated from materials that include, but are not limited to alumina-based ceramic composites.

Enclosure 150 also includes two flared portions, i.e., an outboard flared portion 158 and an inboard flared portion 160 that are coupled to and extend radially and axially from cylindrical portion 152. In the exemplary embodiment, portions 158 and 160 are substantially conical. Portions 158 and 160 are positioned between magnetic bearings 146 and 148, respectively, and at least a portion of stator assembly 122. Portion 158 includes a radially inner surface 162 and a radially outer surface 164. Portion 160 includes a radially inner surface 166 and a radially outer surface 168. Parameters associated with the materials used to fabricate portion 158 and 160 include, but are not limited to having sufficient strength and corrosion resistance to mitigate portions 158 and 160 distortion and corrosion during operation and may also include properties that facilitate conductive heat transfer. Portions 158 and 160 may be fabricated from materials that include, but are not limited to Incoloy 925®, Inconel 718®, and stainless steel.

In the exemplary embodiment, portions 152 and 158 are fabricated of similar materials that are joined at their interfaces using methods that may include, but are not limited to welding or brazing the portion 158 to portion 152, or casting portion 158 and portion 152 as a unitary portion (not shown in FIGS. 2 and 3). Subsequently, portion 160 that is fabricated of a material different from portion 158 and portion 152 is coupled to portion 152 on an axially opposing side from portion 158. A substantially toroidal seal 170 is secured to the interface of portion 152 and portion 160 such that isolation of stator 122 from fluids transported within pressure vessel 105 is facilitated. Seal 170 may be fabricated of any materials that have properties that include, but are not limited to those that facilitate material and operational compatibility with portions 152 and 160 material properties as well as facilitate attaining predetermined operational parameters associated with motor 104.

Alternatively, portions 152 and 160 are fabricated of similar materials that are joined at their interfaces using methods that may include, but are not limited to welding or brazing the portion 160 to portion 152, or casting portion 160 and portion 152 as a unitary portion (not shown in FIGS. 2 and 3). Subsequently, portion 158 that is fabricated of a material different from portion 160 and portion 152 is coupled to portion 152 on an axially opposing side from portion 160. A substantially toroidal seal (not shown in FIGS. 2 and 3) that is substantially similar to seal 170 is secured to the interface of portion 158 and portion 152 such that isolation of stator 122 from fluids transported within pressure vessel 105 is facilitated.

Also, alternatively, both portions 158 and 160 may be fabricated from materials different from portion 152 materials. In this alternative embodiment, a plurality of substantially toroidal seals 170 are secured to the interfaces of portions 152 and 160 and 152 and 158. Further, alternatively, portions 152, 158 and 160 may be fabricated of similar materials that may be joined at their interfaces using methods as described above.

In the exemplary embodiment, portion 152 is substantially cylindrical and portions 158 and 160 are substantially conical. Alternatively, portions 152, 158 and 160 may be a combination of any geometrical configurations that facilitate attaining predetermined operational parameters associated with motor 104 and station 100 (discussed further below).

Figure 4:
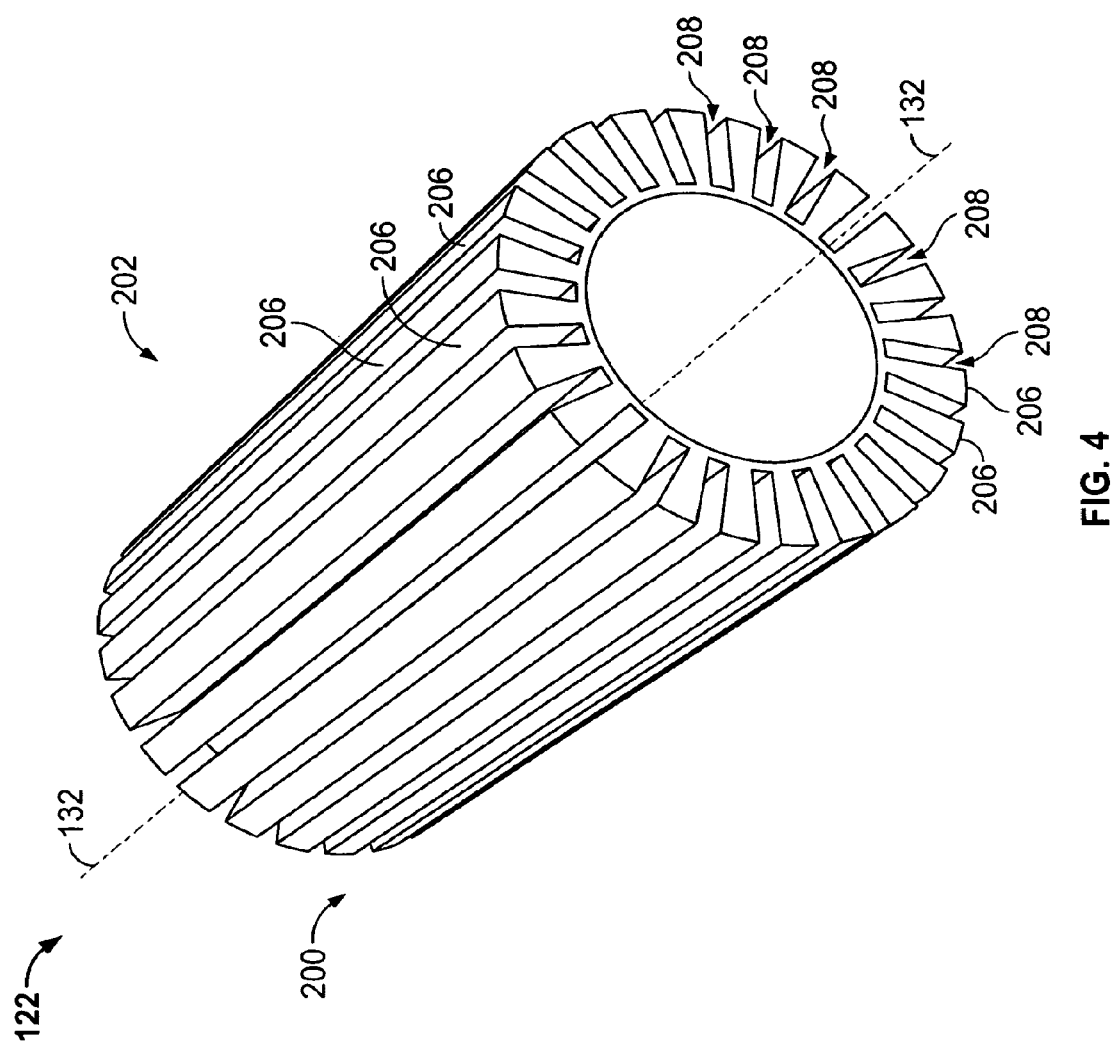
FIG. 4 is a skewed axial schematic of an exemplary teeth portion of an exemplary stator assembly that may be used with the electric motor shown in FIG. 2.

FIG. 4 is a skewed axial schematic of an exemplary teeth portion 202 of exemplary stator assembly 122 that may be used with electric motor 104 (shown in FIG. 2). FIG. 4 is referenced in conjunction with FIG. 2 for a discussion of enclosure teeth portion 202. Rotor 104 axis of rotation 132 is illustrated in FIG. 4 for perspective.

Stator assembly 122 includes a substantially cylindrical stator core portion 200. Core portion 200 is positioned within at least a portion of a stator assembly compartment 172 defined by pressure vessel 105 and enclosure 150 (discussed further below). Core portion 200 includes a substantially cylindrical teeth portion 202 and a substantially cylindrical yoke portion 204. Teeth portion 202 includes a plurality of adjacent stator teeth 206 wherein adjacent teeth 206 define a plurality of adjacent stator winding slots 208.

Each tooth 206 is fabricated by stacking individual laminations (not shown in FIGS. 2 and 4) by methods known in the art to form teeth with predetermined axial and radial dimensions. Teeth 206 are fixedly coupled to enclosure teeth portion radially outer surface 156 circumferentially such that winding slots 208 are formed with predetermined axial and radial dimensions. In the exemplary embodiment, teeth 206 are positioned on surface 156 via axial slots using a tongue and groove arrangement (not shown in FIGS. 2 and 4). Alternatively, teeth 206 are coupled to surface 156 using methods that may include, but are not limited to welding, brazing, and adhesives.

Figure 5:
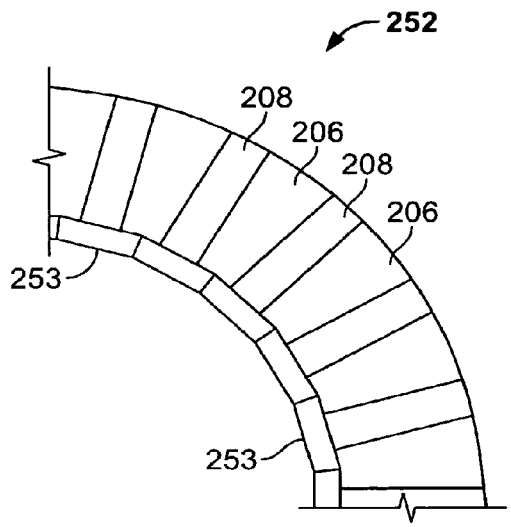
FIG. 5 is an axial schematic view of a portion of an alternative enclosure teeth portion that may be used with the electric motor shown in FIG. 2.

In the exemplary embodiment, enclosure center portion 152 is cylindrical. Alternatively, enclosure center portion 152 may be formed with predetermined polygonal dimensions. FIG. 5 is an axial schematic view of a portion of an alternative enclosure teeth portion 252 that may be used with electric motor 104 (shown in FIG. 2). Alternative portion 252 is an extruded polygon that includes a plurality of extruded segments 253. In this alternative embodiment, extruded segments 253 are sized and positioned such that segments 253 are substantially centered over slots 208 and a number of segments 253 equals a number of slots 208. Moreover, in this alternative embodiment, segments 253 and teeth 206 are sized and positioned such that vertices of extruded polygonal portions 252 are substantially centered on teeth 206.

Figure 6:
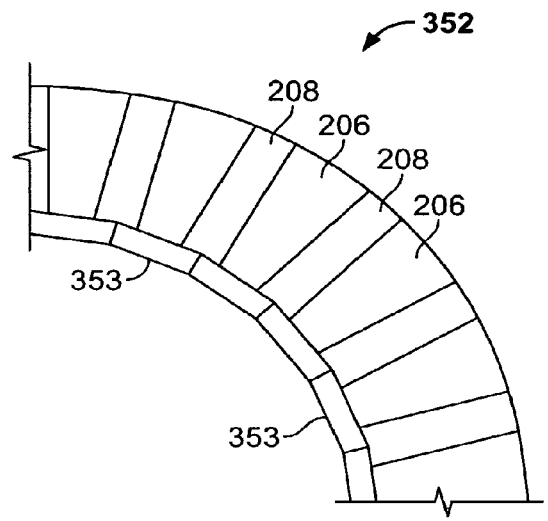
FIG. 6 is an axial schematic view of a portion of an alternative enclosure teeth portion that may be used with the electric motor shown in FIG. 2.

FIG. 6 is an axial schematic view of a portion of an alternative enclosure teeth portion 352 that may be used with electric motor 104 (shown in FIG. 2). Alternative portion 352 is an extruded polygon that includes a plurality of extruded segments 353. In this alternative embodiment, extruded segments 353 are sized and positioned such that segments 353 are substantially centered over teeth 206 and a number of segments 353 equals a number of slots 208. Moreover, in this alternative embodiment, segments 253 and slots 208 are sized and positioned such that vertices of extruded polygonal portions 352 are substantially centered over slots 208.

Figure 7:
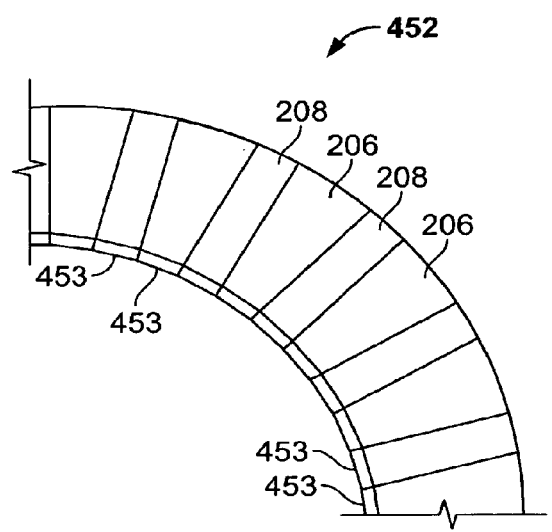
FIG. 7 is an axial schematic view of a portion of an alternative enclosure teeth portion that may be used with the electric motor shown in FIG. 2.

FIG. 7 is an axial schematic view of a portion of an alternative enclosure teeth portion 452 that may be used with electric motor 104 (shown in FIG. 2). Alternative portion 452 is an extruded polygon that includes a plurality of extruded segments 453. In this alternative embodiment, extruded segments 453 are sized and positioned such that a portion of segments 453 are substantially centered over teeth 206 and a portion of segments 453 are substantially centered over slots 208 in an alternating fashion. Moreover, in this alternative embodiment, the number of segments 453 equals the sum of a number of teeth 206 and a number of slots 208.

Figure 8:
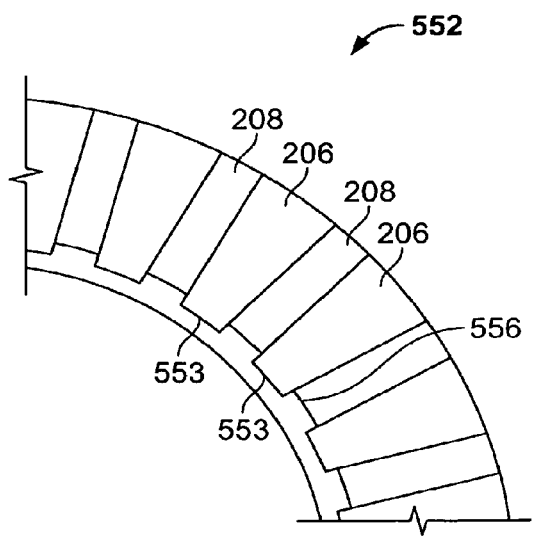
FIG. 8 is an axial schematic view of a portion of an alternative enclosure teeth portion that may be used with the electric motor shown in FIG. 2.

FIG. 8 is an axial schematic view of a portion of an alternative enclosure teeth portion 552 that may be used with electric motor 104 (shown in FIG. 2). Alternative portion 552 includes a geometrical shape that may be, but not be limited to a right circular cylinder or an extruded polygon. In this alternative embodiment, portion 552 includes a plurality of slots 553 defined within a radially outer surface 556 wherein a number of slots 553 equals the number of teeth 208. Slots 553 include predetermined axial and radial dimensions that facilitate receiving teeth 206, thereby facilitating circumferential alignment of teeth 206.

Figure 9:
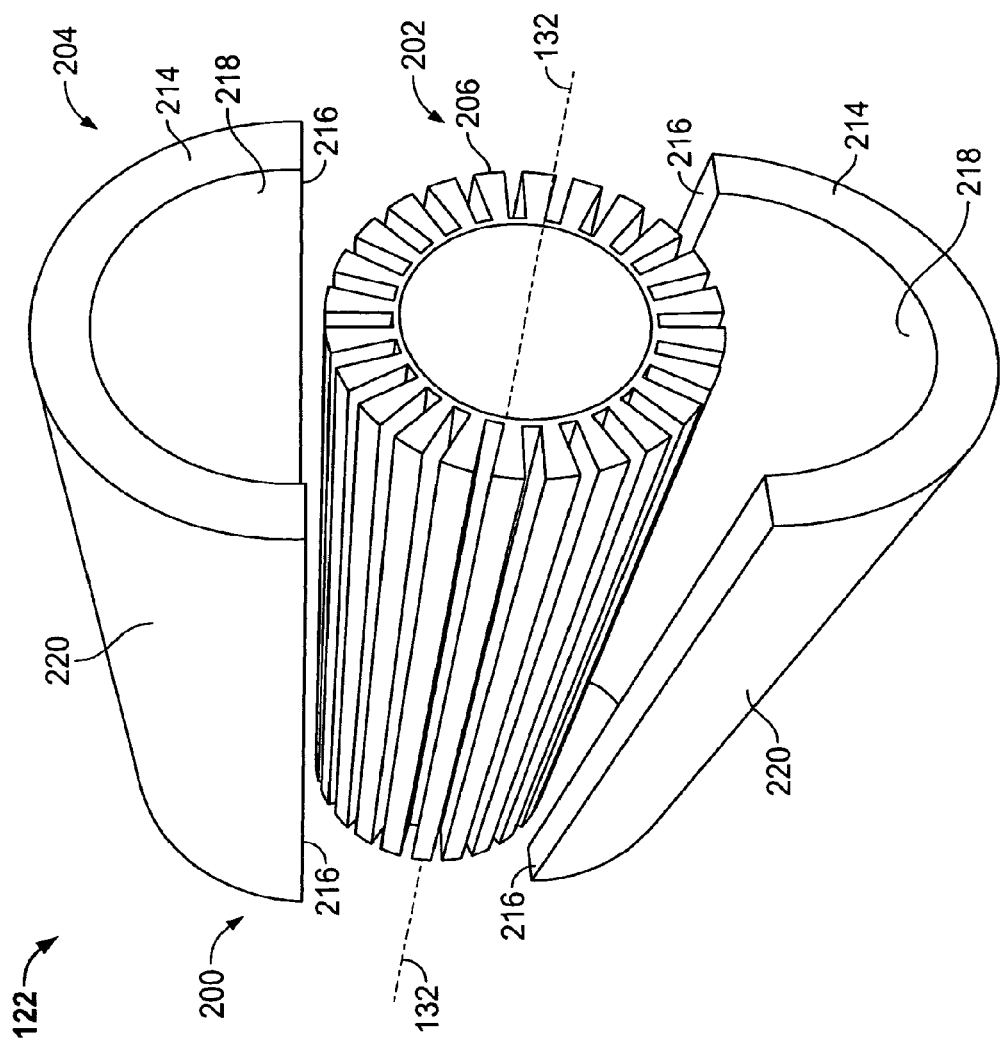
FIG. 9 is a skewed axial schematic view of an exemplary yoke portion of the exemplary stator assembly that may be used with the electric motor shown in FIG. 2.

FIG. 9 is a skewed axial schematic of an exemplary yoke portion 204 of exemplary stator core portion 200 of exemplary stator assembly 122 that may be used with electric motor 104 (shown in FIG. 2). Rotor 104 axis of rotation 132 is illustrated for perspective. FIG. 9 is referenced in conjunction with FIG. 2 for a discussion of yoke portion 204. In the exemplary embodiment, yoke 204 includes two substantially similar yoke sections 214. Each of yoke sections 214 includes a plurality of axial yoke mating surfaces 216, a radially inner surface 218 and a radially outer surface 220. Yoke sections 214 are fabricated using methods, materials and apparatus known in the art. Parameters associated with the materials used to fabricate yoke sections 214 include, but are not limited to having sufficient strength and corrosion resistance to mitigate yoke 204 distortion and corrosion during operation and may also include properties that facilitate conductive heat transfer.

Yoke sections 214 are coupled at mating surfaces 216 by means of a pressure fit from an external enclosure such as pressure vessel 105 and secured using methods that include, but are not limited to welding and brazing. Yoke 204 extends over teeth portion 202 and is sized such that at least a portion of yoke radial inner surface 218 contacting at least a portion of a radial outer surface of teeth 206 is facilitated. Yoke 204 is also sized such that at least a portion of yoke radial outer surface 220 contacting a radially inner surface of pressure vessel 105 (neither shown in FIG. 9) is facilitated. Moreover, yoke 204 is sized to facilitate positioning within stator compartment 172 (shown in FIG. 2).

FIG. 10 is a cross-sectional schematic of a plurality of thermally conductive laminations 232 and 234 of exemplary stator assembly 122 that may be used with electric motor 104 (shown in FIG. 2). Rotor axis of rotation 132 is illustrated for perspective. FIG. 10 is referenced in conjunction with FIG. 2 for a discussion of the exemplary stator laminations. Specifically, teeth portion 202 includes a plurality of magnetic laminations 230 and a plurality of thermally conductive laminations 232. More specifically, each tooth 206 (shown in FIG. 4) includes a plurality of magnetic laminations 230 and a plurality of thermally conductive laminations 232. Magnetic laminations 230 have a predetermined magnetic permeability such that magnetic flux generation and conduction is facilitated within core portion 200. Thermally conductive laminations 232 have heat transfer properties that facilitate heat removal from core portion 200 more efficiently and effectively than laminations 230. In the exemplary embodiment, thermally conductive laminations 232 have copper or copper alloy as the primary constituent. Alternatively, laminations 232 may include any number and any percentage of constituents that attain predetermined parameters that facilitate operation of motor 104.

In the exemplary embodiment, yoke portion 204 is substantially similar to the description above. A plurality of thermally conductive laminations 234 that are substantially similar to laminations 232 in teeth portion 202 are interspersed within yoke portion 204.

Laminations 232 and 230 are interspersed within teeth portion 202 and laminations 234 are interspersed within yoke portion 204 such that predetermined parameters for heat removal from core portion 200 and for magnetic coupling of stator 122 with rotor 120 across gap 124 are attained. In the exemplary embodiment, thermally conductive laminations 232 are interspersed within stator teeth portion 202 wherein there are substantially similar axial lengths, or axial pitch, between each of laminations 232. Also, in the exemplary embodiment, thermally conductive laminations 234 are interspersed within yoke portion 204 at substantially similar axial lengths between each of laminations 234 and with a radial dimension such that thermal communication between laminations 232 and 234 is facilitated. Moreover, in the exemplary embodiment, laminations 232 and 234 within teeth portion 202 and yoke portion 204, respectively, have substantially similar axial dimensions, i.e., thicknesses. Furthermore, in the exemplary embodiment, the thicknesses of laminations 232 are substantially uniform within core portion 200, i.e., a substantially uniform thickness distribution of laminations 232 is attained within core portion 200 wherein the thicknesses of each of laminations 232 are substantially similar. Similarly, in the exemplary embodiment, the thicknesses of laminations 234 are substantially uniform within core portion 200, i.e., a substantially uniform thickness distribution of laminations 234 is attained within core portion 200 wherein the thicknesses of each of laminations 234 are substantially similar. Alternatively, a distribution of differing predetermined thicknesses of laminations 232 and 234 may be used to facilitate attaining predetermined parameters that facilitate operation of motor 104. This alternative distribution may include a uniform or non-uniform distribution of varying thicknesses.

FIG. 11 is a cross-sectional schematic of an alternative stator with a plurality of thermally conductive laminations 332 and 334 in a yoke portion 304 that are thicker than those in a teeth portion 302 that may be used with electric motor 104 (shown in FIG. 2). Rotor axis of rotation 132 is illustrated for perspective. Alternative stator core 300 includes alternative teeth portion 302 and alternative yoke portion 304. Teeth portion 302 includes a plurality of magnetic laminations 330 and a plurality of thermally conductive laminations 332 that are identical to similar components in the exemplary embodiment. Yoke portion 304 includes a plurality of thermally conductive laminations 334 that are substantially similar to laminations 234 (shown in FIG. 10) with the exception that an axial dimension (i.e., thickness) of laminations 334 is larger than an axial dimension (thickness) of laminations 234. In addition, the axial dimension (thickness) of yoke portion laminations 334 is larger than an axial dimension (thickness) of teeth portion laminations 332. This alternative embodiment facilitates a uniform temperature distribution within and heat removal from yoke portion 304. Moreover, in this alternative embodiment, laminations 332 and 334 within teeth portion 302 and yoke portion 304, respectively, have substantially similar axial dimensions, i.e., thicknesses. Furthermore, in this alternative embodiment, the thicknesses of laminations 332 are substantially uniform within core portion 300, i.e., a substantially uniform thickness distribution of laminations 332 is attained within core portion 300 wherein the thicknesses of each of laminations 332 are substantially similar. Similarly, in the exemplary embodiment, the thicknesses of laminations 334 are substantially uniform within core portion 300, i.e., a substantially uniform thickness distribution of laminations 334 is attained within core portion 300 wherein the thicknesses of each of laminations 334 are substantially similar. Alternatively, a distribution of differing predetermined thicknesses of laminations 332 and 334 may be used to facilitate attaining predetermined parameters that facilitate operation of motor 104. This alternative distribution may include a uniform or non-uniform distribution of varying thicknesses.

FIG. 12 is a cross-sectional schematic of an alternative stator with a plurality of thermally conductive laminations 432 and 434 in a tooth portion 402 that are thicker than those in a yoke portion 404 that may be used with electric motor 104 (shown in FIG. 2). Rotor axis of rotation 132 is illustrated for perspective. Alternative stator core 400 includes alternative teeth portion 402 and alternative yoke portion 404. Teeth portion 402 includes a plurality of magnetic laminations 430 that are substantially similar to laminations 230 (shown in FIG. 10) in the exemplary embodiment with the exception that laminations 430 are configured to receive a plurality of alternative thermally conductive laminations 432. Laminations 432 are substantially similar to laminations 232 (shown in FIG. 10) with the exception that an axial dimension (thickness) of laminations 432 is larger than an axial dimension (thickness) of laminations 232. Yoke portion 404 includes a plurality of thermally conductive laminations 434 that are substantially similar to laminations 234 (shown in FIG. 10). In this alternative embodiment, the axial dimension (thickness) of teeth portion laminations 432 is larger than an axial dimension (thickness) of yoke portion laminations 434. This alternative embodiment facilitates a uniform temperature distribution within and effective heat removal from teeth portion 402. Moreover, in this alternative embodiment, laminations 432 and 434 within teeth portion 402 and yoke portion 404, respectively, have substantially similar axial dimensions, i.e., thicknesses. Furthermore, in this alternative embodiment, the thicknesses of laminations 432 are substantially uniform within core portion 400, i.e., a substantially uniform thickness distribution of laminations 432 is attained within core portion 400 wherein the thicknesses of each of laminations 432 are substantially similar. Similarly, in the exemplary embodiment, the thicknesses of laminations 434 are substantially uniform within core portion 400, i.e., a substantially uniform thickness distribution of laminations 434 is attained within core portion 400 wherein the thicknesses of each of laminations 434 are substantially similar. Alternatively, a distribution of differing predetermined thicknesses of laminations 432 and 434 may be used to facilitate attaining predetermined parameters that facilitate operation of motor 104. This alternative distribution may include a uniform or non-uniform distribution of varying thicknesses.

FIG. 13 is a cross-sectional schematic of a plurality of alternative thermally conductive stator laminations 532 and 534 with a varying axial pitch that may be used with electric motor 104 (shown in FIG. 2). Rotor axis of rotation 132 is illustrated for perspective. Alternative stator core 500 includes alternative teeth portion 502 and alternative yoke portion 504. Teeth portion 502 includes a plurality of magnetic laminations 530 that are substantially similar to laminations 230 (shown in FIG. 10) in the exemplary embodiment with the exception that laminations 530 are configured to receive a plurality of alternative thermally conductive laminations 532. Laminations 532 are substantially similar to laminations 232 (shown in FIG. 10) with the exception that laminations 532 are interspersed within stator teeth portion 502 wherein there are varied axial lengths between each of laminations 532. Yoke portion 504 includes a plurality of thermally conductive laminations 534 that are substantially similar to laminations 234 (shown in FIG. 10) with the exception that laminations 534 are interspersed within stator toke portion 504 wherein there are varied axial lengths between each of laminations 534. The axial dimensions between laminations 532 within teeth portion 502 and laminations 534 within yoke portion 504 are substantially similar such that thermal communication between laminations 532 and 534 is facilitated. This alternative embodiment facilitates a uniform temperature distribution within and effective heat removal from core portion 500. Moreover, in this alternative embodiment, laminations 532 and 534 within teeth portion 502 and yoke portion 504, respectively, have substantially similar axial dimensions, i.e., thicknesses. Furthermore, in this alternative embodiment, the thicknesses of laminations 532 are substantially uniform within core portion 500, i.e., a substantially uniform thickness distribution of laminations 532 is attained within core portion 500 wherein the thicknesses of each of laminations 532 are substantially similar. Similarly, in the exemplary embodiment, the thicknesses of laminations 534 are substantially uniform within core portion 500, i.e., a substantially uniform thickness distribution of laminations 534 is attained within core portion 500 wherein the thicknesses of each of laminations 534 are substantially similar. Alternatively, a distribution of differing predetermined thicknesses of laminations 532 and 534 may be used to facilitate attaining predetermined parameters that facilitate operation of motor 104. This alternative distribution may include a uniform or non-uniform distribution of varying thicknesses.

With reference to FIG. 2, stator 122 also includes a plurality of armature windings of which a plurality of end windings, or end turn, portions 236 and 238 are illustrated. Specifically, stator core portion 200 includes a plurality of outboard and inboard winding end turn portions 236 and 238, respectively. In the exemplary embodiment, a plurality of end turn support members 240 are secured to flared portions radially outer surfaces 164 and 168 such that radial and axial support of winding end turn portions 236 and 238 are facilitated. Alternatively, any number of members 240 including, but not being limited to none, may be used. Members 240 may be fabricated of any materials that have properties that include, but are not limited to those that facilitate material and operational compatibility with surfaces 164 and 168 and winding end turn portions 236 and 238 material properties as well as facilitate attaining predetermined operational parameters associated with motor 104.

Figure 14:
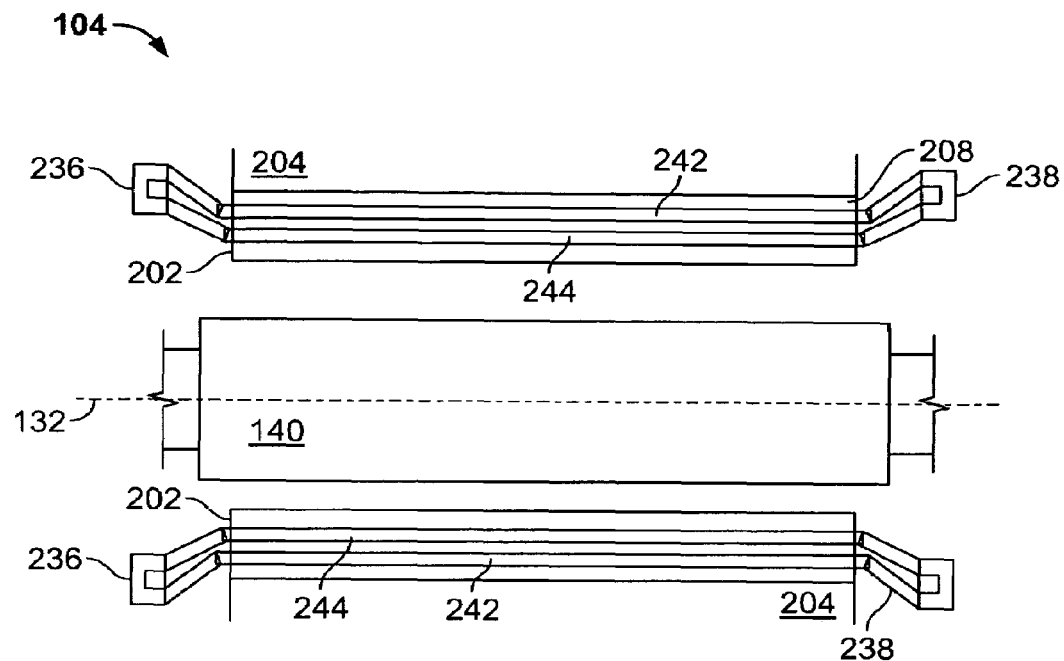
FIG. 14 is a cross-sectional schematic view of a plurality of exemplary armature windings that may be used with the electric motor shown in FIG. 2.
Figure 15:
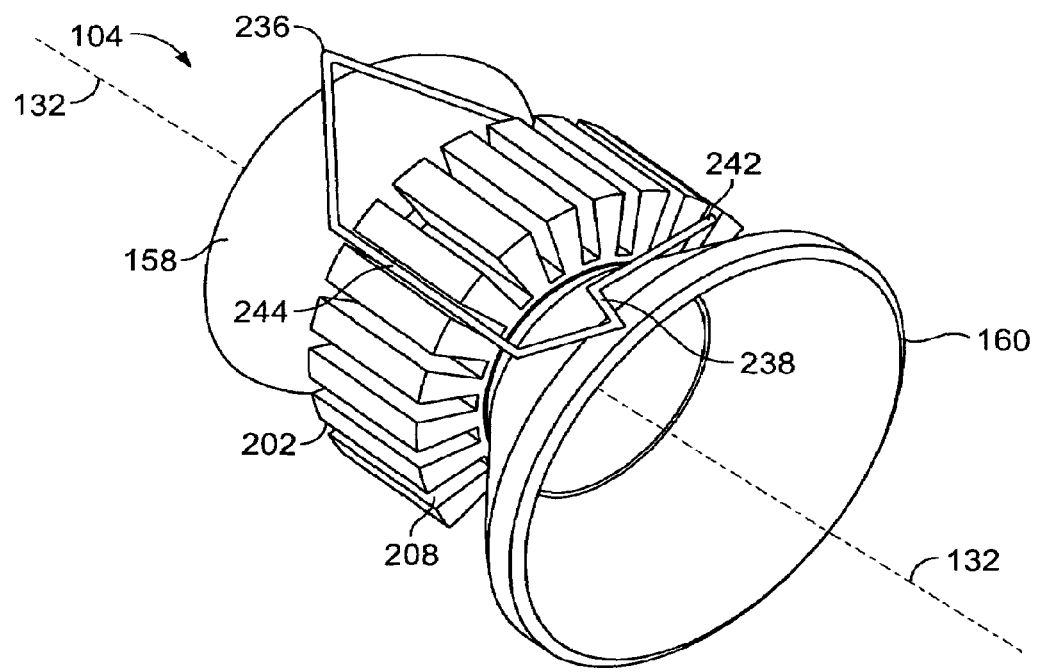
FIG. 15 is a skewed axial schematic of the stator teeth portion coupled to a stator enclosure center portion that may be used with the electric motor shown in FIG. 2.

FIG. 14 is a cross-sectional schematic view of a plurality of exemplary armature slot outer and inner windings 242 and 244, respectively, that may be used with electric motor 104. Rotor portion 140, rotor axis of rotation 132 and yoke portion 204 are illustrated for perspective. FIG. 15 is a skewed axial schematic of stator teeth portion 202 coupled to stator enclosure center portion 152 (shown in FIG. 3) that may be used with electric motor 104. Rotor axis of rotation 132 and flared enclosure portions 158 and 160 are illustrated in FIG. 15 for perspective. Teeth portion 202 receives a plurality of armature slot outer and inner windings 242 and 244, respectively, within slots 208. Windings 242 are positioned in a radially outer portion of slots 208. Windings 244 are positioned in a radially inner portion of slots 208. Winding end turns 236 and 238 are electrically coupled to and extend axially outward from windings 242 and 244 and windings 242 and 244 and end turns 236 and 238 form one coil. In this configuration, a radially winding 244 of one coil is positioned radially inward of a radially outer winding 242 of another coil within slot 208. Alternatively, any number of and any configuration of windings may be used. In the exemplary embodiment, windings 242 and 244 and end turn portions 236 and 238 are electrically conductive bars fabricated with materials, apparatus and methods known in the art. Alternatively, windings 242 and 244 and end turn portions 236 and 238 may be, but not be limited to electrically conductive cables. Positioning windings 242 and 244 within slots 208 prior to enclosing teeth portion 202 within yoke portion 204 facilitates an efficiency of assembly and facilitates mitigating a potential for distorting windings 242 and 244.

Figure 16:
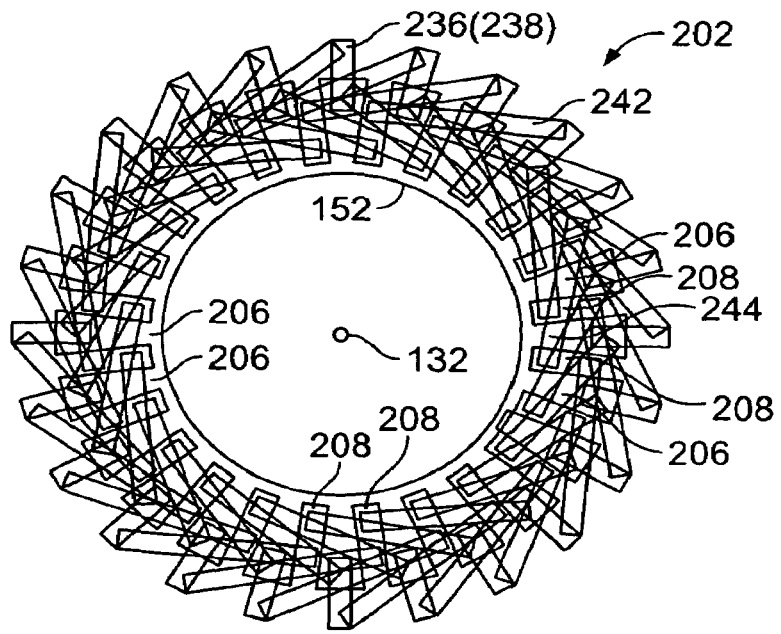
FIG. 16 is a cross-sectional axial schematic view of the plurality of exemplary armature windings that may be used with the electric motor shown in FIG. 2.

FIG. 16 is a cross-sectional axial schematic view of plurality of exemplary armature windings 242 and 244 that may be used with electric motor 104 (shown in FIG. 2). Rotor axis of rotation 132 and enclosure portion 152 are illustrated for perspective. Teeth portion 202 is illustrated with all of windings 242 and 244 positioned within slots 208 between teeth 206 and end turn portions 236 (and 238) extending therefrom. Windings 242 and 244 and end turn portions 236 (and 238) are illustrated as substantially transparent and enclosure flared portions 158 (and 160) (shown in FIG. 15) are omitted to facilitate perspective.

Figure 17:
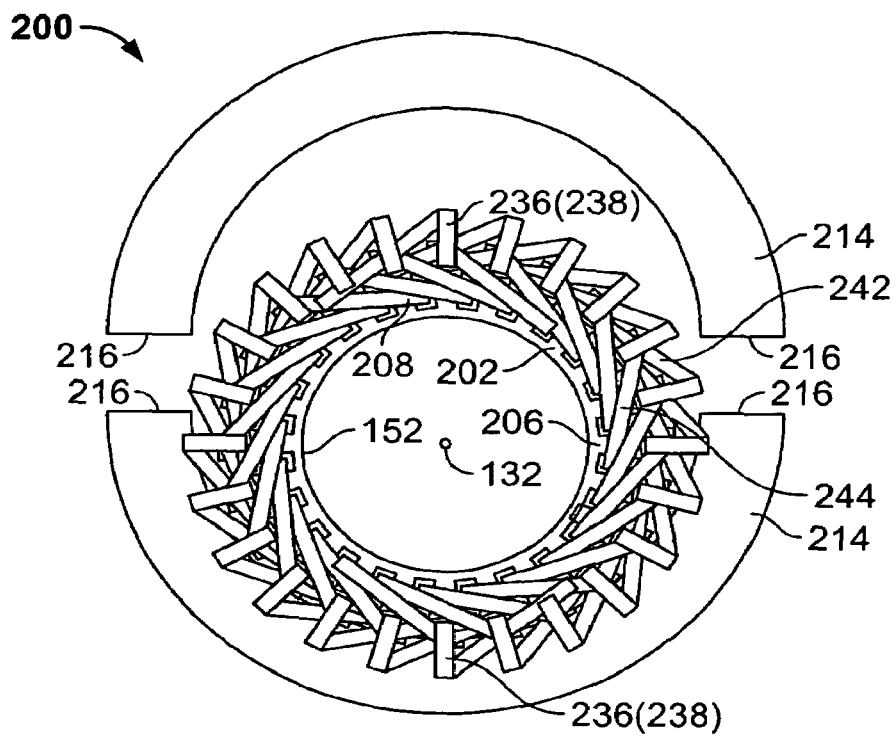
FIG. 17 is a cross-sectional axial schematic view of a plurality of yoke portion segments that are coupled over the plurality of armature windings to form an exemplary stator core portion that may be used with the electric motor shown in FIG. 2.

FIG. 17 is a cross-sectional axial schematic view of a plurality of yoke portion segments 214 that are coupled over plurality of armature windings 242 and 244 to form exemplary stator core portion 200 that may be used with electric motor 104 (shown in FIG. 2). Rotor axis of rotation 132 and enclosure portion 152 are illustrated and enclosure flared portions 158 (and 160) (shown in FIG. 15) are omitted for perspective. Teeth portion 202 is illustrated with all of windings 242 and 244 positioned within slots 208 between teeth 206 and end turn portions 236 (and 238) extending therefrom. Teeth portion 202 is further illustrated as being positioned within first of yoke sections 214. End turns portions 236 (and 238) extend axially and flare radially outward from teeth portion 202 and are illustrated as partially obscuring lower yoke section 214. In the exemplary embodiment, upper yoke section 214 is positioned over teeth portion 202 and windings 242 and 244 and coupled to lower yoke section 214 at mating surfaces 216 as described above. Moreover, assembling yoke portion 204 in this manner facilitates mitigating disturbing or distorting armature windings 242 and 244 as well as end turn portions 236 and 238.

Figure 18:
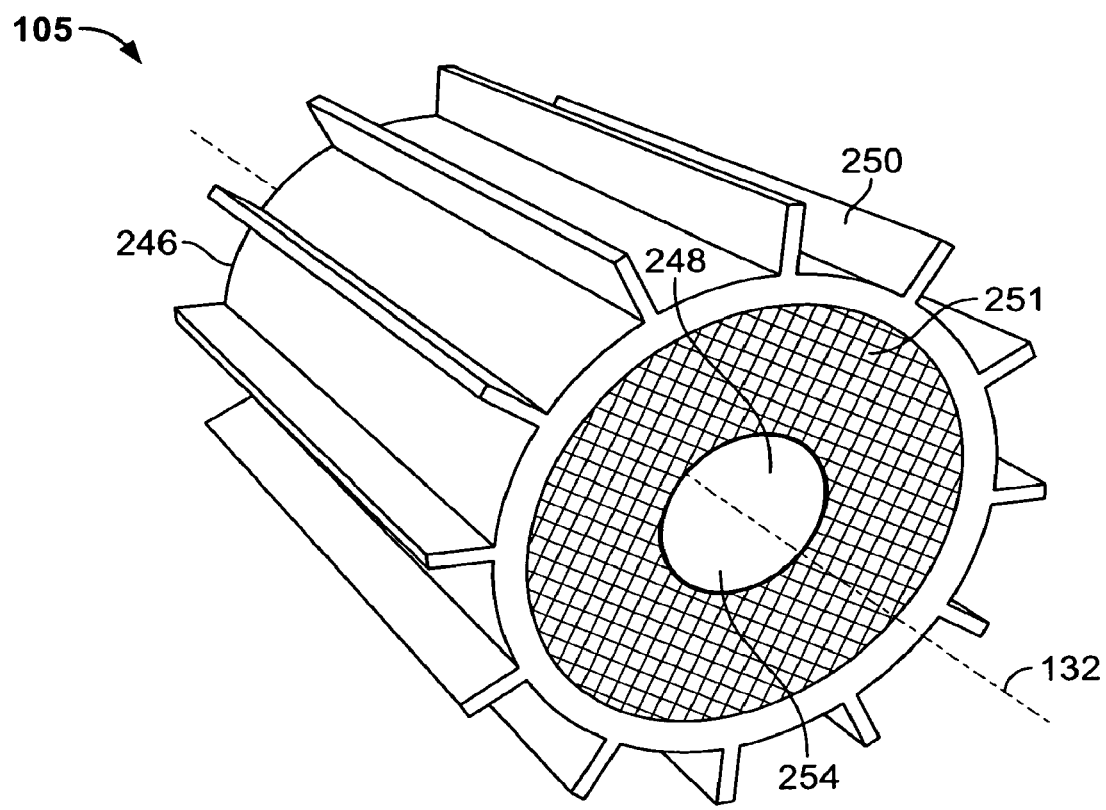
FIG. 18 is a skewed axial schematic view of an exemplary pressure vessel that may be used with the electric motor shown in FIG. 2.

FIG. 18 is a skewed axial schematic view of exemplary pressure vessel 105 that may be used with electric motor 104 (shown in FIG. 2). Rotor axis of rotation 132 is illustrated for perspective. FIG. 18 is referenced in conjunction with FIG. 2 for discussion of pressure vessel 105. Pressure vessel 105 includes a substantially cylindrical radially outer surface 246, a radially inner surface 248, and a plurality of external fins 250. Fins 250 are fixedly coupled to outer surface 246. Pressure vessel 105 further includes a plurality of substantially toroidal end walls 251 positioned at axially opposing ends of pressure vessel 105 that extend radially inward from inner surface 248.

In the exemplary embodiment, fins 250 and at least one end wall 251 are fabricated integrally with pressure vessel 105 via methods that include, but are not limited to forging and casting. Alternatively, fins 250 end walls 251 may be fabricated independently and coupled to pressure vessel outer surface 246 and inner surface, respectively, via methods that include, but are not limited to welding and brazing. Fins 250 include predetermined axial and radial dimensions that facilitate heat transfer from motor 104. End walls 251 include predetermined radial dimensions to facilitate defining an annular passage 254. Opening 254 is sized to facilitate receipt of rotor spindle portion 142 and seal 137. Parameters associated with the materials used to fabricate pressure vessel 105 include, but are not limited to having sufficient heat transfer properties to facilitate conductive heat transfer, and having sufficient strength and corrosion resistance to mitigate pressure vessel 105 distortion and corrosion during operation. Materials that may be used to fabricate pressure vessel 105 include, but are not limited to Incoloy 925®, Inconel 718®, and stainless steel.

In the exemplary embodiment, pressure vessel 105 is substantially cylindrical. Alternatively, pressure vessel 105 and its associated components may be of any shape and/or configuration that attain predetermined operating parameters. Also, in the exemplary embodiment, the radial distance between surfaces 246 and 248, i.e., the thickness of pressure vessel 105, and the materials of fabrication of pressure vessel 105 are sufficient to facilitate tolerating operating parameters such as, but not being limited to external operating pressures and temperatures associated with the depth and body of water in which station 100 is submerged as well as the properties of the fluid being transported.

Figure 19:
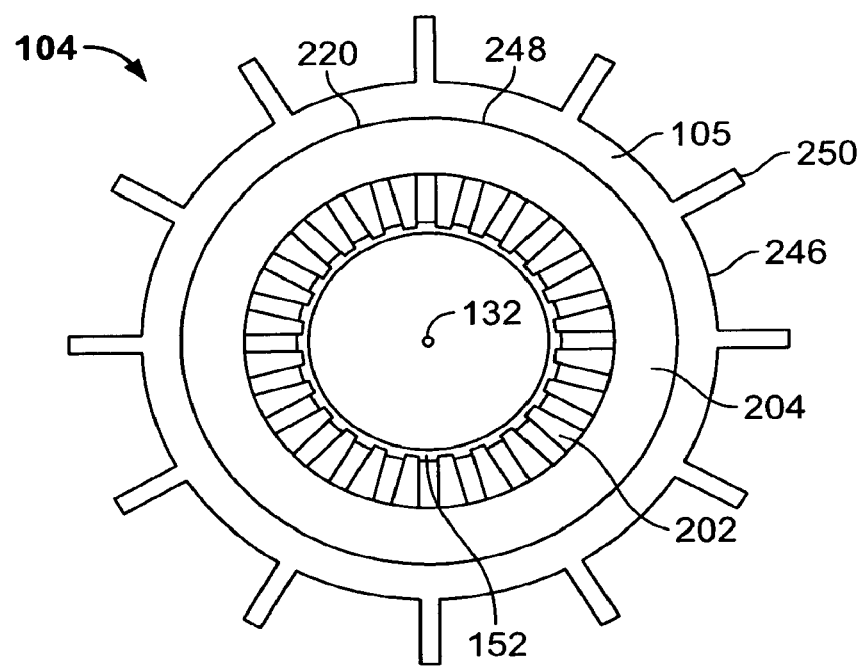
FIG. 19 is an axial schematic view of the exemplary pressure vessel that may be used with the electric motor shown in FIG. 2.

FIG. 19 is an axial schematic view of exemplary pressure vessel 105 that may be used with electric motor 104. Rotor axis of rotation 132, enclosure center portion 152, teeth portion 202, and yoke portion 204 are illustrated and walls 251 are omitted for clarity and perspective. FIG. 19 and FIG. 2 are referenced together to further discuss pressure vessel 105. In the exemplary embodiment, pressure vessel inner surface 248 is coupled to yoke portion outer surface 220 in thermal communication such that conductive heat transfer from yoke portion 204 to pressure vessel 105 is facilitated. Methods of coupling surface 248 to surface 220 may include, but not be limited a pressurized interference fit that includes, but is not limited to a thermal shrink fit and/or a hydraulic shrink fit such that a preloaded low tolerance fit is attained. To further couple surface 248 to surface 220, a seam defined at the fit regions by surface 248 and surface 220 may be sealed by methods that include, but are not limited to welding, brazing, adhesive bonding and sintering. The interference fit of pressure vessel 105 to yoke portion 204 facilitates securing teeth portion 202 between yoke portion 204 and enclosure 150.

In reference to FIG. 2, a portion of each of end walls 251 is coupled to an axially outermost portion of enclosure flared portions 158 and 160 to form substantially toroidal stator compartment 172. Compartment 172 substantially isolates stator core 200 from the transport fluid. Compartment 172 may be further described as a plurality of portions. A substantially annular center portion 260 of compartment 172 is defined between enclosure center portion radially outer surface 156 and a portion of pressure vessel radially inner surface 248 and houses stator core portion 200. An outboard end turn portion 262 is defined between a portion of center portion radially outer surface 156, flared portion radially outer surface 164, end wall 252, a portion of pressure vessel radially inner surface 248 and axially outboard surfaces of core 200. Portion 262 houses stator end turn portion 236. An inboard end turn portion 264 is defined between a portion of center portion radially outer surface 156, flared portion radially outer surface 168, end wall 252, a portion of pressure vessel radially inner surface 248 and axially inboard surfaces of core 200. Portion 264 houses stator end turn portion 238.

In the exemplary embodiment, compartment 200 is filled with a dielectric fluid, for example, but not being limited to transformer oil. The dielectric fluid has properties that include, but are not limited to facilitating convective and conductive heat transfer and mitigating potential for electrical arc discharges within compartment 200.

With reference to FIGS. 1 and 2, in operation, the fluid being transported by compressor 102 (shown in FIG. 1) may also be used to facilitate cooling of motor 104. Prior to electrically powering stator 122 and starting motor 104 a volume 106 within pressure vessel 105 that excludes stator compartment 172 and includes the volume defined by motor end cover assembly 118 and end walls 252 is filled with transport fluid at a predetermined rate of pressurization and attains a predetermined pressure that may include, but not be limited to a pressure substantially similar to that of inlet pipeline 110. As volume 106 pressure is changed, stator enclosure 172 pressure may be changed as well using methods and apparatus known in the art to facilitate mitigating pressure differentials between volume 105 and stator compartment 172.

Once motor 104 is powered and rotor 120 is rotating, heat losses and fluid friction losses of transport fluid may generate a temperature increase of rotor portion 140. Transport fluid in flow and thermal communication with rotor assembly 120, and in particular, portion 140 may facilitate heat transfer from rotor portion 140 to other components that include, but are not limited to motor end cover assembly 118 and enclosure portions 152, 158 and 160 for subsequent heat transfer to an outside environment and the dielectric fluid within compartment 172, respectively.

Also, during operation of motor 104, wherein stator 122 is electrically powered, heat losses within stator end turn portion 236 and 238 typically increase the temperature of the associated components. Heat losses within portions 236 and 238 are substantially conductively transferred to the dielectric fluid. Convective fluid flow within compartment portions 262 and 264 is induced by the difference in dielectric fluid temperatures between dielectric fluid in contact with stator end turn portions 236 and 238 and dielectric fluid not in contact with portions 236 and 238. Heat is subsequently transferred to pressure vessel 105.

Further, during operation of motor 104, wherein stator 122 is electrically powered, heat losses within stator teeth portion 202 via armature windings 242 and 244 (shown in FIG. 14) are substantially collected and channeled to pressure vessel 105 via conductive heat transfer of laminations 232 and 234.

As discussed above, during operation, pressure vessel 105 tends to receive a predetermined heat energy at a predetermined rate of heat transfer from motor 104 components. The environment surrounding pressure vessel 105 typically has a lower temperature than the environment within pressure vessel 105. Therefore, surface 246 and fins 250 are typically cooler than surface 248 and heat transfer from motor 104 to the environment external to pressure vessel 105 is facilitated.

The compressing station described herein facilitates transporting natural gas through a pipeline. More specifically, the compressing station assembly includes a compressing device coupled to a super-synchronous electric motor. Super-synchronous electric motors facilitate elimination of additional components, for example, gearboxes, thereby facilitating a smaller foot print of the station as well as eliminating the associated gearbox maintenance costs. Such motors also facilitate station operation at higher energy densities and at higher speeds, thereby further reducing the foot print, as well as facilitating the advantages of higher efficiency due to the capability to operate at higher speeds. As a result, the operating efficiency of compressing stations may be increased and the stations' capital and maintenance costs may be reduced.

The methods and apparatus for transporting a fluid within a pipeline described herein facilitates operation of a fluid transport station. More specifically, the motor as described above facilitates a more robust fluid transport station configuration. Such motor configuration also facilitates efficiency, reliability, and reduced maintenance costs and fluid transport station outages.

Exemplary embodiments of motors as associated with fluid transport station are described above in detail. The methods, apparatus and systems are not limited to the specific embodiments described herein nor to the specific illustrated motors and fluid transport station.

While the invention has been described in terms of various specific embodiments, those skilled in the art will recognize that the invention can be practiced with modification within the spirit and scope of the claims.

What is claimed is:

1. A stator assembly for an electrical machine, said stator assembly comprising:
   a pressure vessel comprising at least one enclosure defined therein, wherein said at least one enclosure comprises at least one wall that facilitates channeling a first fluid within at least a portion of said pressure vessel, said at least one enclosure maintains a second fluid therein such that the second fluid is isolated from the first fluid;
   a yoke comprising a plurality of members, each of said members comprising at least one mating surface, said members are removably coupled together along said mating surfaces, wherein said yoke is within said pressure vessel; and
   a plurality of teeth defining a plurality of slots such that adjacent teeth define a slot therebetween, said plurality of teeth within said yoke.

2. A stator assembly in accordance with claim 1 wherein said at least one enclosure at least one wall comprises a first member and a second member extending from said first member and configured to support at least one stator end winding, said at least one enclosure first and second members facilitate heat transfer from the at least one stator end winding to the second fluid.

3. A stator assembly in accordance with claim 2 wherein said at least one enclosure first member comprises at least one of:
   a substantially cylindrical assembly; and
   a polygonal assembly comprising a plurality of extrusions defining a plurality of surfaces.

4. A stator assembly in accordance with claim 2 wherein said first member comprises at least one of:
   a plurality of surfaces that are each substantially centered over a respective one of said plurality of slots;
   a plurality of surfaces that are each substantially centered over a respective one of said plurality of teeth; and
   a plurality of surfaces that are substantially centered over each of said plurality of teeth and said plurality of slots.

5. A stator assembly in accordance with claim 2 wherein at least a portion of said first member extends into at least a portion of said plurality of slots and at least a portion of said plurality of teeth extend into at least a portion of said first member.

6. A stator assembly in accordance with claim 1 wherein said pressure vessel comprises at least one projection extending outward from a radially outer surface of said pressure vessel, said at least one projection facilitates heat transfer from said yoke and from at least one stator assembly end winding.

7. A stator assembly in accordance with claim 1 wherein said pressure vessel, said yoke, and said plurality of teeth are coupled such that an interference fit between at least a portion of said plurality of teeth and at least a portion of said yoke and an interference fit between at least a portion of said plurality of teeth and at least a portion of said enclosure are facilitated.

8. A stator assembly in accordance with claim 1 wherein said plurality of slots and said yoke are configured to receive at least a portion of at least one armature winding prior to coupling said yoke to said plurality of teeth.

9. A fluid transport station comprising:
   a fluid transport assembly, said fluid transport assembly comprising at least one rotatable shaft; and
   a drive motor comprising a rotor assembly and a stator assembly comprising a pressure vessel, a yoke, and a plurality of teeth, said pressure vessel comprising at least one enclosure defined therein, wherein said at least one enclosure comprises at least one wall that facilitates channeling a first fluid within at least a portion of said pressure vessel, said at least one enclosure maintains a second fluid therein such that the second fluid is isolated from the first fluid, said yoke comprising a plurality of members, each of said members comprising at least one mating surface, said members are removably coupled together along said mating surfaces, wherein said yoke is within said pressure vessel, said plurality of teeth defining a plurality of slots such that adjacent teeth define a slot therebetween, said plurality of teeth within said yoke, said rotor magnetically coupled to said stator assembly, said drive motor rotor assembly rotatably coupled to said fluid transport assembly at least one rotatable shaft.

10. A fluid transport station in accordance with claim 9 wherein said fluid transport assembly comprises at least one of the following:
    a fluid compressor;
    a fluid pump; and
    a fluid fan.

11. A fluid transport station in accordance with claim 9 wherein said pressure vessel comprises at least one projection extending outward from a radially outer surface of said pressure vessel, said at least one projection facilitates heat transfer from said yoke and from at least one stator assembly end winding.

12. A fluid transport station in accordance with claim 9 wherein said pressure vessel, said yoke, and said plurality of teeth are coupled such that an interference fit between at least a portion of said plurality of teeth and at least a portion of said yoke and an interference fit between at least a portion of said plurality of teeth and at least a portion of said enclosure are facilitated.

13. A fluid transport station in accordance with claim 9 wherein said plurality of slots and said yoke are configured to receive at least a portion of at least one armature winding prior to coupling said yoke to said plurality of teeth.

* * * * *

UNITED STATES PATENT AND TRADEMARK OFFICE
CERTIFICATE OF CORRECTION

PATENT NO. : 7,579,724 B2  Page 1 of 1
APPLICATION NO. : 11/446029
DATED : August 25, 2009
INVENTOR(S) : Kaminski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Fourteenth Day of September, 2010

David J. Kappos
*Director of the United States Patent and Trademark Office*